UNITED STATES PATENT OFFICE.

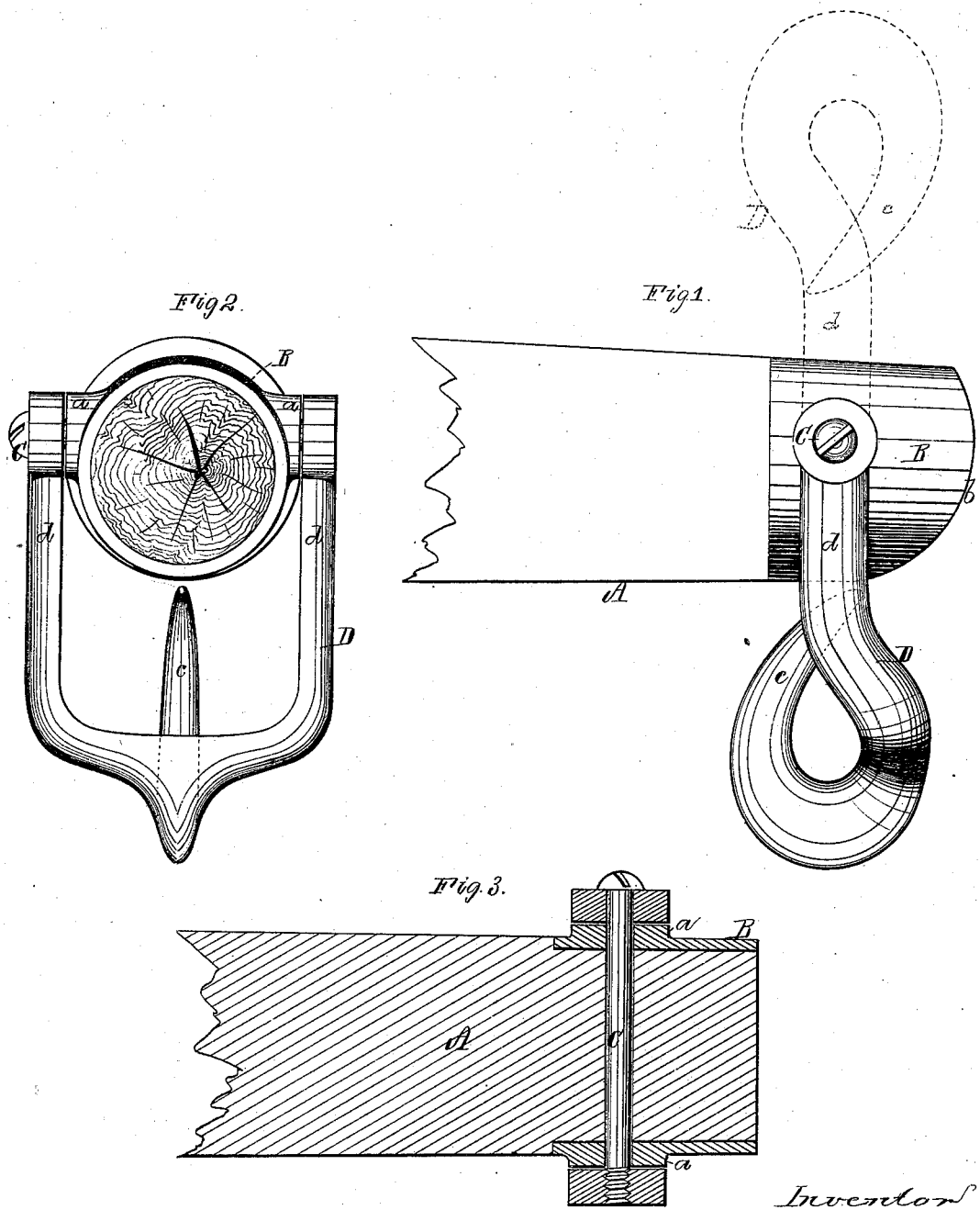

GEORGE W. JACKMAN, OF BATH, NEW HAMPSHIRE.

IMPROVEMENT IN WHIFFLETREE-HOOKS.

Specification forming part of Letters Patent No. 201,789, dated March 26, 1878; application filed January 22, 1878.

*To all whom it may concern:*

Be it known that I, GEORGE W. JACKMAN, of Bath, of the county of Grafton and State of New Hampshire, have invented a new and useful Improvement in the Trace Attachments of Whiffletrees; and do hereby declare the same to be described in the following specification and represented in the accompanying drawings, of which—

Figure 1 is a top view, Fig. 2 an end elevation, and Fig. 3 a longitudinal section, of a portion of a whiffletree with my invention or improved trace attachment.

In some respects my attachment is like that described in the United States Patent No. 190,913, though differing in other and material features constituting or necessary to my improvement.

My duplex-shank hook is combined with a collar to encompass the whiffletree, and is held thereto by a bolt going through both shanks, the collar, and the whiffletree. This not only strengthens the whiffletree and the connection of the hook therewith, but renders the attachment noiseless, on account of the bolt turning or being mostly in the whiffletree.

In the drawings, A denotes the whiffletree, having upon its end the short tube or metallic collar B, which is provided with two bearing-ears, *a a*, extending from it, as shown. The outer ends of the whiffletree and collar are rounded, as represented at *b*, to a curve whose radius has its center in the axis of the screw-bolt C or the two ears *a a*.

The hook shown at D has a nose, *c*, and two shanks or arms, *d d*, arranged, formed, and combined as represented. The collar goes between the shanks, and the bolt extends through them and the wood or whiffletree, and screws into the lower of the shanks. The bolt, besides acting as a pivot to the hook, serves to hold the collar in place on the wood.

In Fig. 1 the hook is represented by the dotted lines as in its rear position for discharge of a trace. The bolt is arranged far enough back of the axis of the whiffletree to permit the ready attachment or removal of the trace when the hook is turned back. The collar serves to protect the wood from being chafed by the trace.

When the pivot and nose of the hook are arranged with the whiffletree in manner as shown in the aforesaid patent, the nose of the hook, on the hook being turned back, will be carried about the length of the shank beyond the whiffletree, whereby the difficulty of either detaching or applying the trace will be materially increased to what is the case with the arrangement represented in the accompanying figures.

I do not claim a trace attachment made and applied to a round-end whiffletree in manner as represented in the aforesaid Patent No. 190,913—that is, with the nose of the hook to stand toward the end of the whiffletree, and the pivot of the hook arranged at the back of the whiffletree, and supported by a plate fastened thereto; but

I claim—

1. The combination of the rounded-end collar B, provided with the bearing-ears *a a*, and the bolt C, with the duplex-shanked hook D, constructed and arranged therewith substantially as set forth.

2. The combination of the rounded-end whiffletree A and collar B, provided with the bearing-ears *a a*, with the bolt C and the duplex-shanked hook D, arranged therewith substantially as shown and described.

GEORGE W. JACKMAN.

Witnesses:
 WILLARD WEEKS,
 EDWARD C. POOL.